United States Patent [19]
Belde et al.

[11] 3,841,888

[45] Oct. 15, 1974

[54] AQUEOUS PIGMENT DISPERSIONS

[75] Inventors: Horst Belde; Knut Oppenlaender; Ewald Daubach; Rolf Fikentscher, all of Ludwigshafen, Germany

[73] Assignee: Badische Anilin- and Soda-Fabrik Aktiengesellschaft, Ludwigshafen/Rhine, Germany

[22] Filed: Nov. 3, 1972

[21] Appl. No.: 303,624

[52] U.S. Cl...... 106/288 Q, 106/308 N, 106/308 Q, 106/288 B
[51] Int. Cl........................ C08h 17/02, C09c 3/02
[58] Field of Search........ 106/308 N, 308 Q, 288 B, 106/288 Q

[56] References Cited
UNITED STATES PATENTS

| | | | |
|---|---|---|---|
| 3,094,499 | 6/1963 | Gassmann et al............... | 106/308 Q |
| 3,337,360 | 8/1967 | Schonbach et al............. | 106/308 N |

*Primary Examiner*—Delbert E. Gantz
*Assistant Examiner*—J. V. Howard
*Attorney, Agent, or Firm*—Johnston, Keil, Thompson & Shurtleff

[57] ABSTRACT

An aqueous pigment dispersion which contains (a) pigment, (b) a water-soluble surfactant and water and a water-retaining agent in which (b) is a reaction product of an aliphatic or aromatic diamine or polyhydroxyl compound with from 3 to 50 moles of propylene oxide and from 2 to 70 moles of ethylene oxide per equivalent of reactive amino hydrogen or hydroxyl. The dispersions give bright and deep-shade emulsion paints or distempers containing cellulose ethers.

8 Claims, No Drawings

AQUEOUS PIGMENT DISPERSIONS

The invention relates to aqueous pigment dispersions which are outstandingly suitable for coloring aqueous emulsion paints or distempers containing cellulose ethers.

Aqueous pigment paints containing binders such as emulsion paints, wallpaper colors or distempers as a rule contain white pigments such as titanium dioxide, lithopone and chalk, extenders such as China clay, very finely ground dolomite, calcite, barite and/or talc, surfactants such as ethylene oxide adducts of phenols or alcohols or anionic surfactants and binders such as starch, dextrin, vegetable glue, bone glue and/or other animal glues and/or aqueous dispersions of film-forming homopolymers or copolymers such as those of acrylic esters, methacrylic esters, acrylic acid, styrene, butadiene, acrylonitrile, vinyl acetate, vinyl propionate and mixtures of the same. Water-soluble cellulose ethers such as methylcellulose and/or carboxymethylcellulose are added to the emulsion paints to improve their application properties. The viscosity and consequently the flow of white and colored emulsion paints prepared therefrom are improved by the addition of water-soluble cellulose ethers. White paints are colored with aqueous pigment dispersions, as a rule immediately prior to use. Pigment dispersions used for this purpose are prepared by homogenization or dispersion of pigments with anionic or non-ionic dispersing agents such as oxyethylated phenols or alkylphenols or oxyethylated fatty alcohols.

These dispersions are more or less extensively flocculated when stirred into the emulsion paint containing a cellulose ether so that the tinctorial strength of the pigment contained in the paint is decreased and, what is particularly disadvantageous, the shade of color is dulled.

It is an object of the present invention to provide aqueous pigment dispersions which are stable to flocculation in aqueous emulsion paints containing a cellulose ether and which will color such paints in pure shades.

We have found that fully satisfactory aqueous emulsion paints containing cellulose ethers which have pure shades of color and in which the pigment is not flocculated are obtained by using, for coloring, an aqueous pigment dispersion which contains on the bases of (a) + (b) + (c);

(a) from 20 to 55 percent by weight of a finely divided pigment;

(b) from 5 to 25 percent by weight of a water-soluble surfactant or mixture of surfactants which has been obtained by reaction of ($\alpha$) an amine of the formula (I):

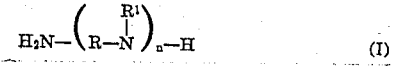

$$H_2N-\left(R-\overset{R^1}{\underset{|}{N}}\right)_n-H \qquad (I)$$

in which
R is saturated alkylene of 2 to 6 carbon atoms;
$R^1$ is hydrogen, alkyl of 1 to 6 carbon atoms, cyclohexyl or phenyl; and
n is one of the integers from 1 to 5 and, when n is 1 the group $NHR^1$ may be attached to the other amino group ($\beta$) an aromatic or cycloaliphatic diamine or ($\gamma$) a hydroxyl compound of the formula (II):

$$A(OH)_m \qquad (II)$$

in which
A is an m-valent aliphatic or cycloaliphatic radical of 2 to 10 carbon atoms;
OH is primary or secondary hydroxyl; and
m is one of the integers from 2 to 6 with from 3 to 50 moles of propylene oxide per equivalent of primary and secondary hydroxyl or reactive amino hydrogen followed by reaction with from 2 to 70 moles of ethylene oxide per equivalent of primary and secondary hydroxyl or reactive amino hydrogen; and (c) from 40 to 75 percent by weight of water or a mixture of water and a water-retaining agent.

The aqueous pigment dispersions of the invention give colorations of deep and pure shade after they have been mixed with the white emulsion paint and applied, e.g., printed, and dried.

Colored inorganic and organic pigments are suitable as the pigments.

Carbon black and iron oxide are examples of inorganic colored pigments.

Examples of organic pigments are azo pigments, quinacridone pigments, anthraquinoid pigments, pigments based on perylene-3,4,9,10-tetracarboxylic acid and the corresponding diimides, phthalocyanines, halogenated phthalocyanines and oxazine pigments.

The water-soluble surfactants are obtained by the addition of propylene oxide followed by the addition of ethylene oxide to an amine of formula (I) or an aromatic or cycloaliphatic diamine. Examples of suitable amines of formula (I) are ethylene diamine, diethylene triamine, triethylene tetramine, tetraethylene pentamine, propylenediamine-1,3, dipropylene triamine, tripropylene tetramine, tetrapropylene pentamine, 3-amino-1-ethylaminopropane, bis-(3-aminopropyl)-methylamine, 3-amino-1-cyclohexylaminopropane, dihexamethylene triamine, 1,6-bis-(3-aminopropylamino)-hexane, N-methyldipropylene triamine, N,N'-diphenylethylene diamine and piperazine. Examples of aromatic and cycloaliphatic diamines are o-phenylene diamine, m-phenylene diamine, p-phenylene diamine, the toluylene diamines, bis-(3-methyl-4-aminophenyl)-methane, 1,1-bis-(4-aminophenyl)-cyclohexane, 1,2-diaminocyclohexane, 1,4-diaminocyclohexane and 4,4'-diaminodicyclohexylmethane.

Adducts which are preferred because of their particularly good effect on stabilization are those obtained by reaction of o-phenylenediamine, m-phenylenediamine, p-phenylenediamine, ethylenediamine, diethylenetriamine, propylenediamine-(1,3), dipropylenetriamine, piperazine, N-bis-(3-aminopropyl)-N-methylamine, N-($\beta$-aminoethyl)-ethanolamine, bis-(3-methyl-4-aminopropyl)-methane or mixtures of the same with the said amounts of propylene oxide and ethylene oxide.

Reaction products of the said amines with from 8 to 20 moles of propylene oxide and 12 to 30 moles of ethylene oxide per equivalent of reactive amino hydrogen are particularly preferred.

Examples of hydroxyl compounds of formula (II) are ethylene glycol, propylene glycol-1,3, propylene glycol-1,2, butanediol-1,3, butanediol-1,4, butenediol-1,4, butynediol, butanetriol, pentanediol-1,5, hexanediol-1,6, decanediol-1,10, glycerol, pentaerythritol, trimethylolpropane, sorbitol, triethanolamine, aminoethylethanolamine, triisopropanolamine, hexahydroterephthalyl alcohol, cyclohexanediol-1,4, cyclohexanediol-1,3 and mixtures of the same.

Because of their particularly great stabilizing effect the reaction products of trimethylolpropane, butanediol-1,4, triethanolamine, glycerol, pentaerythritol, aminoethylethanolamine or mixtures of the same are preferred and of these the reaction products of 8 to 20 moles of propylene oxide and 12 to 30 moles of ethylene oxide per equivalent of primary and secondary hydroxyl groups are particularly preferred.

The water-soluble surfactants are obtained by stagewise reaction of the amine or hydroxyl compound (II) with from 3 to 50, preferably from 8 to 20, moles of propylene oxide per equivalent of amino hydrogen or primary and secondary hydroxyl groups followed by oxyethylation of the polypropoxylated compound with from 2 to 70, preferably 12 to 30, moles of ethylene oxide per equivalent of primary and secondary hydroxyl groups or active amino hydrogen. The polypropoxylatedpolyethoxylated compounds to be used according to the invention are obtainable for example by the method of U.S. Pat. No. 2,979,528. The water-soluble surfactants have a molecular weight of from 1,000 to 42,000, preferably from 7,000 to 17,500. The proportion of terminal polyethylene oxide blocks is from 30 to 80 percent, preferably from 40 to 70 percent, by weight. Products having more than 80 percent by weight or less than 40 percent by weight of the ethylene oxide blocks do not have an adequate stabilizing effect, i.e., the colored pigment contained in the emulsion paints is flocculated.

Production of the aqueous pigment dispersion of the invention is carried out in conventional manner by dispersion or homogenization of the pigment in dry form or in the form of a press cake together with the water-soluble surfactant in a kneader, dispersion mixer, sand or Perl mill or attritor mill. Other auxiliaries such as water-retaining agents or disinfectants may be added to the mixture during the dispersion or thereafter.

The formulations of the invention not only have the said advantage of stabilizing the fine state of subdivision of the colored pigment in the aqueous emulsion paint containing cellulose ether but also the following further advantage; unlike systems which contain anionic dispersing agents or ethylene oxide adducts of fatty alcohols or phenols, the formulations of the invention are stable to drying up, i.e., there is no formation in the storage vessels of crusts or skins which fall into the pigment dispersion upon removal and which may give trouble in the colored emulsion paint in the form of specks or lumps.

The following Examples will further illustrate the invention. Parts and percentages are by weight.

EXAMPLE 1

(a) 88 parts of a copper phthalocyanine blue of the α-modification is treated in a kneader with 22 parts of a product obtained by reaction of 1 mole of m-phenylenediamine with 68 moles of propylene oxide and then with 74 moles of ethylene oxide, for one hour with an addition of 22 parts of water. A temperature of about 80°C is thus set up. The kneaded material is then diluted with a mixture of water and ethylene glycol (1:1) to such an extent that the liquid formulation contains 40 percent of pigment. The formulation obtained is stirred into an emulsion paint of the composition given below and the resultant color is brushed or printed onto wallpaper. After drying a pure deep-blue coloration is obtained in which no flocculation whatever can be detected.

To test stability to flocculation of the pigment dispersion, an emulsion paint of the following composition is used:

14.0 parts of barium sulfate
14.0 parts of calcium/magnesium carbonate
14.0 parts of titanium dioxide
13.0 parts of an aqueous solution containing: 2 percent of 15 percent ammonia solution, 1 percent of the ammonium salt of a polyacrylic acid and 1 percent of sodium hexametaphosphate
35.0 parts of polyvinyl propionate dispersion (solids content: about 50 percent)
5.0 parts of a 2 percent aqueous solution of a cellulose ether containing on an average 1.5 methoxyl groups per glucose unit and whose 2 percent aqueous solution has a viscosity of from 1,800 to 2,000 centipoises at 20°C.

1 part of the aqueous pigment dispersion is stirred into 99 parts of the white paint and homogeneously dispersed therein. Testing is carried out by brushing or printing the colored system onto wallpaper after drying.

(b) Comparative experiment:

Instead of the reaction product of m-phenylenediamine and propylene oxide/ethylene oxide specified under (a) as dispersant for the production of the pigment dispersion a conventionally used dispersant such as the sodium salt of the condensation product of naphthalenesulfonic acid and formaldehyde, sodium salt of the acid sulfuric acid ester of an ethylene oxide adduct, ethylene oxide adducts of 1 mole of an alkyl phenol to 10 to 50 moles of ethylene oxide, of 1 mole of fatty alcohol to 12 to 80 moles of ethylene oxide, of 1 mole of oleylamine to 12 moles of ethylene oxide or of 1 mole of p-benzyl-o-phenylphenol to 10 to 20 moles of ethylene oxide or polyethylene oxide, or sodium lignin sulfonate is used as dispersant. Dispersions are obtained from which the pigment flocculates after stirring into the abovementioned emulsion paint.

After brushing onto wallpaper and drying, cloudy and markedly weaker colorations are obtained than with the formulation under (a) at the same pigment concentration.

EXAMPLE 2

76 parts of a carbon black having a surface area (BET method) of 83 $m^2/g$, 20 parts of the reaction product of 1 mole of ethylenediamine with 48 moles of propylene oxide and 51 moles of ethylene oxide and 37 parts of a mixture of water and ethylene glycol (1:1) are kneaded as described in Example 1(a) and then diluted to a formulation containing 35 percent of carbon black.

After 1 part of the dispersion has been stirred with 99 parts of the white paint described in Example 1(a) and the resultant color brushed onto wallpaper a deep coloration is obtained which does not exhibit any flocculation.

EXAMPLE 3

80 parts of copper phthalocyanine blue of the α-modification and 27 parts of the reaction product of 1 mole of dipropylenetriamine with 66.5 moles of propylene oxide and 74 moles of ethylene oxide are dispersed as described in Example 1 and diluted to a liquid dispersion which contains 40 percent of pigment.

A mixture of 1 part of the dispersion and 99 parts of the white paint described in Example 1(a) is brushed onto wallpaper. A deep coloration having a pure blue shade is obtained.

EXAMPLE 4

400 parts of a polychlorocopper phthalocyanine (chlorine content: 48.6 percent) is kneaded with 80 parts of the reaction product of 1 mole of ethylenediamine with 65 moles of propylene oxide and 60 moles of ethylene oxide in a kneader with a mixture of water and ethylene glycol (1:1) as described in Example 1(a) and made up to a dispersion having a pigment concentration of 50 percent. A mixture of 1 part of the dispersion and 99 parts of the white paint described in Example 1(a) is brushed onto wallpaper. A deep coloration in pure blue-green shade is obtained which does not evidence any flocculation of the pigment.

EXAMPLE 5

400 parts of the reaction product of perylene tetracarboxylic anhydride and p-chloroaniline is kneaded with 123 parts of the reaction product of 1 mole of ethylenediamine with 90 moles of propylene oxide and 56 moles of ethylene oxide in a kneader for half an hour with an addition of 108 parts of water, the temperature rising to about 70°C. The kneaded material is adjusted with a mixture of water and glycol (1:1) to give a mixture having a pigment concentration of 32 percent.

The system gives a coloration having a deep and pure shade with the white paint of Example 1(a).

EXAMPLE 6

75 parts of a copper phthalocyanine blue of the β-modification is kneaded for one hour in a kneader with 25 parts of the reaction product of 2 moles of bis-(3-methyl-4-aminophenyl)-methane with 68 moles of propylene oxide and 74 moles of ethylene oxide, with an addition of 7 parts of ethylene glycol, the kneaded material reaching a temperature of about 100°C. The kneaded product is then diluted to a formulation which contains 20 percent of ethylene glycol and 44 percent of pigment in addition to water, dispersing auxiliary and mold preventives.

The system does not exhibit any flocculation in the white paint of Example 1(a).

EXAMPLE 7

80 parts of C.I. Pigment Violet 23, C.I. No. 51,319, is kneaded with 20 parts of the reaction product of 1 mole of diethylenetriamine with 67 moles of propylene oxide and 74 moles of ethylene oxide for 30 minutes in a kneader with an addition of 36 parts of water, the temperature of the kneaded product rising to about 60°C.

The kneaded material is diluted to a dispersion having a pigment concentration of 35 percent and 1 part is stirred with 99 parts of the dispersion of Example 1(a) and applied. The deep violet coloration obtained exhibits no flocculation of the pigment.

EXAMPLE 8

80 parts of copper phthalocyanine of the α-modification (1.6 percent of chlorine) is kneaded with the addition of 10 parts of a mixture (1:1) of water and dipropylene glycol and 20 parts of the reaction product of 1 mole of triethanolamine and 68 moles of propylene oxide and 74 moles of ethylene oxide in a kneader; the temperature rises to about 65°C.

The kneaded material is diluted to a 40 percent dispersion with water and dipropylene glycol, the dispersion containing 20 percent of dipropylene glycol. The dispersion obtained does not exhibit any flocculation in the white paint of Example 1(a).

EXAMPLE 9

80 parts of Pigment C.I. 46,500 is kneaded with 20 parts of the reaction product of 1 mole of ethylenediamine with 65 moles of propylene oxide and 57 moles of ethylene oxide in a kneader with the addition of 34 parts of water. The temperature of the kneaded material rises to about 70°C. The kneaded material is diluted to a dispersion with 40 percent of pigment in the manner described in Example 8.

This dispersion does not exhibit any flocculation in the white paint of Example 1(a).

EXAMPLE 10

(a) 175 parts of carbon black having a surface area (BET method) of 80 $m^2/g$, 50 parts of the reaction product of 1 mole of ethylenediamine with 70 moles of propylene oxide and 70 moles of ethylene oxide are dispersed in 135 parts of ethylene glycol, 137 parts of water and 3 parts of an aqueous solution of sodium pentachlorophenolate by wet grinding in a sand mill.

1 part of this dispersion containing 35 percent of carbon black is stirred into 99 parts of the paint described in Example 1(a). After application to wallpaper a place rubbed with the finger while still moist does not exhibit any higher depth of color than the coating which has not been rubbed.

(b) Comparative experiment:

The procedure described under (a) is adopted but instead of the reaction product of ethylenediamine with propylene oxide and ethylene oxide there is used as the dispersant the same amount of the sodium salt of the reaction product of naphthalenesulfonic acid with formaldehyde, of the ethylene oxide adduct of 1 mole of nonylphenol with 10 to 50 moles of ethylene oxide or lignin sulfonate.

1 part of the dispersion thus prepared is stirred into 99 parts of the paint described in Example 1(a) and the color obtained is applied to wallpaper. When the coating is rubbed with the finger while it is still wet, the paint applied at the rubbed place has a higher depth of color than at places which have not been rubbed.

EXAMPLE 11

(a) 86 parts of a copper phthalocyanine blue of the α-modification is kneaded with 20 parts of a product which has been obtained by reaction of 1 mole of trimethylolpropane with 45 moles of propylene oxide and then with 49 moles of ethylene oxide in a kneader with an addition of 30 parts of a mixture (1:1) of water and glycol. A temperature of about 75°C is thus set up. The kneaded material is then diluted with a mixture (1:1) of water and ethylene glycol until the liquid formulation contains 40 percent of pigment and 20 percent of glycol. To test the stability to flocculation, the paint described in Example 1 is used. 1 part of the above aqueous dispersion is stirred into 99 parts of the paint and homogeneously dispersed. The colored emulsion system obtained is brushed or printed onto wallpaper. After drying a deep and pure blue coloration is obtained which does not exhibit any flocculation at all.

(b) Comparative experiment:

Conventionally used dispersants such as the sodium salt of the condensation product of naphthalenesulfonic acid with formaldehyde, sodium salt of the acid sulfuric acid ester of ethylene oxide adducts or ethylene oxide adducts such as alkylphenol with 10 to 50 moles of ethylene oxide, fatty alcohol with 12 to 80 moles of ethylene oxide, oleylamine with 12 moles of ethylene oxide or p-benzyl-o-phenylphenol with 10 to 20 moles of ethylene oxide, polyethylene oxide or sodium lignin sulfonate are used for the production of the pigment dispersion instead of the reaction product of trimethylolpropane with propylene oxide and ethylene oxide specified as dispersant under (a). Dispersions are obtained whose pigment after having been stirred into the abovementioned paint binder flocculates out.

After having been brushed onto wallpaper and dried, cloudy and markedly paler colorations are obtained than with the pigment formulations under (a) at the same pigment concentration.

EXAMPLE 12

80 parts of C.I. Pigment Green 7, C.I. No. 74,260 and 24 parts of the reaction product of 1 mole of pentaerythritol with 64 moles of propylene oxide and 74 moles of ethylene oxide are kneaded with an addition of 9 parts of dipropylene glycol for 1 hour, the temperature rising to about 100°C. The kneaded material is diluted as described in Example 11 to give a formulation containing 45 percent of pigment.

When a mixture of 1 part of the formulation and 99 parts of the paint described in Example 1(a) is brushed onto wallpaper, a deep and pure blue coloration is obtained in which no flocculation can be detected.

EXAMPLE 13

60 parts of C.I. Pigment Yellow 1, C.I. No. 11,680 and 14 parts of the reaction product of 1 mole of glycerol with 68 moles of propylene oxide and 74 moles of ethylene oxide are processed as described in Example 1 into a liquid formulation containing 45 percent of pigment.

1 part of the formulation is stirred into 99 parts of the paint described in Example 1(a). Deep colorations are obtained in which no flocculation can be detected.

EXAMPLE 14

86 parts of a copper phthalocyanine of the α-modification and 20 parts of the reaction product of 1 mole of trimethylolpropane with 45 moles of propylene oxide and 69 moles of ethylene oxide is kneaded with the addition of a mixture (1:1) of water and glycol, the temperature rising to about 75°C. The kneaded material is then diluted with water and glycol so that a formulation is obtained which contains 40 percent of pigment and 20 percent of glycol.

This formulation does not exhibit any flocculation in the paint of Example 1(a).

EXAMPLE 15

60 parts of a copper phthalocyanine of the β-modification and 14 parts of the reaction product of 1 mole of butanediol-1,4 with 56 moles of propylene oxide and 50 moles of ethylene oxide are kneaded as described in Example 1 and diluted to a formulation containing 40 percent of pigment.

The formulation does not show any flocculation in the paint of Example 1(a).

EXAMPLE 16

80 parts of C.I. Pigment Yellow 16, C.I. No. 20,040, is kneaded with an addition of 10 parts of water with 20 parts of the reaction product of 1 mole of triethanolamine with 68 moles of propylene oxide and 74 moles of ethylene oxide in a kneader. The temperature rises to about 65°C.

The kneaded material is diluted to a 40 percent pigment dispersion by adding 20 percent of glycol. The dispersion obtained shows no flocculation in the paint of Example 1(a).

EXAMPLE 17

80 parts of the reaction product of perylene-3,4,9,10-tetracarboxylic anhydride and p-chloroaniline is kneaded with 25 parts of the reaction product of 1 mole of aminoethylethanolamine with 64 moles of propylene oxide and 74 moles of ethylene oxide for one hour in a kneader; the temperature rises to about 90°C. The kneaded material is diluted by adding dipropylene glycol and water to a 40 percent pigment dispersion which contains 20 percent of dipropylene glycol.

Together with the paint of Example 1(a) a formulation is obtained which gives deep colorations of pure shade on wallpaper which do not exhibit any flocculation.

EXAMPLE 18

80 parts of carbon black having a surface area (BET method) of 83 $m^2/g$, 20 parts of the reaction product of 1 mole of hexanediol-1,6 with 70 moles of propylene oxide and 74 moles of ethylene oxide, and 41 parts of a mixture (1:1) of water and dipropylene glycol are kneaded as described in Example 7, the temperature rising to about 70°C. The kneaded material is then diluted to a pigment formulation which contains 35 percent of carbon black.

By adding this to the paint of Example 1(a) a formulation is obtained which is of pure shade and gives strong colorations on paper.

EXAMPLE 19

80 parts of C.I. Pigment Violet 23, C.I. No. 51,319 is kneaded with 20 parts of the reaction product of 1 mole of decanediol-1,10 with 70 moles of propylene oxide and 74 moles of ethylene oxide for 30 minutes with the addition of about 30 parts of water in a kneader, the temperature rising to about 65°C. The kneaded material is diluted to a paste containing 35 percent of pigment.

Mixtures of this paste with the paint of Example 1(a) give deep colorations on wallpaper and no flocculation can be detected.

EXAMPLE 20

60 parts of a copper phthalocyanine of the α-modification and 15 parts of the reaction product of 1 mole of hexamethylenediamine with 68 moles of propylene oxide and 76 moles of ethylene oxide are dispersed as described in Example 1 and adjusted to a liquid formulation containing 40 percent of pigment.

Mixtures of this formulation with the paint of Example 1(a) give deep colorations of pure shade.

EXAMPLE 21

60 parts of the dye C.I. No. 60,005 (C.I. Vat Violet 9) and 20 parts of the reaction product of 1 mole of piperazine with 67 moles of propylene oxide and 74 moles of ethylene oxide are dispersed as described in Example 1 and adjusted to a liquid formulation containing 40 percent of pigment.

Testing a system with the paint of Example 1(a) gives prints of high tinctorial strength and pure shade on wallpaper.

EXAMPLE 22

90 parts of the pigment C.I. Pigment Green 7, C.I. No. 74,260 and 18 parts of the reaction product of N-bis-(3-aminopropyl)-N-methylamine with 68 moles of propylene oxide and 74 moles of ethylene oxide is processed into a liquid formulation in the manner described in Example 1.

EXAMPLE 23

60 parts of the pigment C.I. Pigment Yellow 1, C.I. No. 11,680 and 14 parts of the reaction product of naphthylenediamine with 68 moles of propylene oxide and 74 moles of ethylene oxide are kneaded for one hour with the addition of 16 parts of dipropylene glycol. A temperature of 75°C is thus set up in the kneaded material. The kneaded material is diluted with water and dipropylene glycol so that a formulation is obtained which contains 45 percent of pigment and 20 percent of dipropylene glycol.

A paint consisting of 99 parts of the paint described in Example 1(a) and 1 part of the above formulation gives bright and deep colorations on wallpaper.

EXAMPLE 24

A liquid formulation is prepared as described in Example 1 from 90 parts of polychlorobromo copper phthalocyanine containing 21.5 percent of chlorine and 40.5 percent of bromine and 25 parts of the reaction product of 1 mole of N-(β-aminoethyl)-ethanolamine with 68 moles of propylene oxide and 74 moles of ethylene oxide.

1 part of this formulation is stirred into 99 parts of the paint described in Example 1(a). Deep yellow green colorations are obtained in which flocculation cannot be detected.

EXAMPLE 25

The procedure described in Example 8 is repeated but the reaction product of o-phenylenediamine with 68 moles of propylene oxide and 74 moles of ethylene oxide is used instead of the reaction product of triethanolamine.

A pigment formulation is obtained which together with the paint of Example 1(a) gives deep colorations in which no flocculation can be detected.

The same result is obtained when the reaction product of o-phenylenediamine with propylene oxide and ethylene oxide is replaced by a reaction product of p-phenylenediamine with 60 moles of propylene oxide and 74 moles of ethylene oxide.

We claim:

1. An aqueous pigment dispersion which does not flocculate in a cellulose-ether-containing emulsion paint or distemper which contains, with reference to the total weight of (a) + (b) + (c):
   (a) from 20 to 55 percent by weight of a finely divided pigment;
   (b) from 5 to 25 percent by weight of a water-soluble surfactant or mixture of surfactants obtained by reaction of
   (α) an amine of the formula

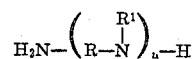

in which
   R is saturated alkylene of 2 to 6 carbon atoms,
   $R^1$ is hydrogen, alkyl of 1 to 6 carbon atoms, cyclohexyl or phenyl, and
   $n$ is one of the integers from 1 to 5 and when $n$ is equal to 1 the group $NHR^1$ may be combined with the other amino group, or
   (β) an aromatic or cycloaliphatic diamine; with from 3 to 50 moles of propylene oxide per equivalent of reactive amino hydrogen and then with from 2 to 70 moles of ethylene oxide per equivalent of reactive amino hydrogen; and
   (c) from 40 to 75 percent by weight of a mixture of water and a water-retaining agent.

2. An aqueous pigment dispersion stable to flocculation according to claim 1 characterized by a content of surfactant (b) which has been obtained by reaction of the amino compound (α) or (β) with from 8 to 20 moles of propylene oxide per equivalent of reactive amino hydrogen and then with 12 to 30 moles of ethylene oxide per equivalent of reactive amino hydrogen.

3. An aqueous pigment dispersion stable to flocculation according to claim 1 characterized by a content of surfactant (b) which has been obtained by reaction of ethylenediamine, diethylenetriamine, propylenediamine-1,3, dipropylenetriamine, hexamethylenediamine, N-bis-(3-aminopropyl)-N-methylamine, N-(β-aminoethyl)-ethanolamine, piperazine, o-phenylenediamine, m-phenylenediamine, p-phenylenediamine, bis-(3-methyl-4-aminophenyl)-methane or mixtures of the same.

4. An aqueous pigment dispersion stable to flocculation according to claim 1 characterized by a content of surfactant (b) which has been obtained by reaction of 1 mole ethylene diamine with 70 moles propylene oxide and 70 moles ethylene oxide.

5. An aqueous pigment dispersion stable to flocculation according to claim 1 characterized by a content of surfactant (b) which has been obtained by reaction of 1 mole phenylene diamine with 68 moles propylene oxide and 74 moles ethylene oxide.

6. A pigment dispersion stable to flocculation according to claim 2 wherein (a) is an inorganic pigment.

7. A pigment dispersion stable to flocculation according to claim 2 wherein (a) is an azo pigment, quinacridone pigment, anthraquinoid pigment, a pigment based on perylene-3,4,9,10-tetracarboxylic acid, a phthalocyanine, polychlorophthalocyanine, polybromochlorophthalocyanine or oxazine pigment.

8. An aqueous emulsion paint containing a cellulose ether and a binder and which has been colored with a pigment dispersion as claimed in claim 1.

* * * * *

UNITED STATES PATENT OFFICE
CERTIFICATE OF CORRECTION

PATENT NO. : 3,841,888
DATED : October 15, 1974
INVENTOR(S) : Horst Belde et al

It is certified that error appears in the above–identified patent and that said Letters Patent are hereby corrected as shown below:

IN THE HEADING:

Please insert

-- Claims priority, Germany, November 15, 1971, P 21 56 603.0

Germany, July 27, 1972, P 22 36 906.8 --

Signed and Sealed this twenty-seventh Day of April 1976

[SEAL]

Attest:

RUTH C. MASON
Attesting Officer

C. MARSHALL DANN
Commissioner of Patents and Trademarks